Figure 1:
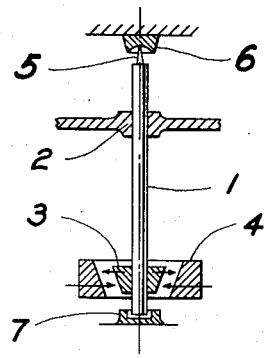

Aug. 18, 1959  O. STETTLER  2,900,602
ELECTRICITY METER
Filed March 7, 1955

INVENTOR.
OSKAR STETTLER
BY
AGENT.

2,900,602

ELECTRICITY METER

Oskar Stettler, Zurich, Switzerland, assignor, by mesne assignments, to North American Philips Company, Inc., New York, N.Y., a corporation of Delaware Application March 7, 1955, Serial No. 492,576

Claims priority, application Switzerland March 13, 1954

7 Claims. (Cl. 324—137)

The invention relates to electricity meters comprising a vertical rotor spindle, in which the weight of the rotor is taken up by a magnetic suspension system which provides centering of the lower end of the rotor. Such electricity meters are known. A known construction comprises two magnetic suspension bearings for guiding the spindle radially, a flat disk provided above the spindle taking up any remaining axial magnetic forces.

The present invention is based on the realisation that, in electricity meters of this type, it is vital that the location of the spindle at the upper end be accurately fixed in a radial sense. Consequently, in accordance with the invention, the upper end of the spindle is provided with the rotary part of a bearing consisting of a point and a cup. As usual, the point is preferably made from steel and the cup from stone, particularly sapphire.

In magnetic suspension bearings, some radial motion of the spindle is naturally still possible. In order to avoid resulting variations of the space between the active measuring member on the one hand and the poleshoes of the drive and brake systems on the other hand, the active measuring member of the rotor, in the usual meters a disk, is, in accordance with the invention, shaped as a hollow sphere segment, the centre of the sphere coinciding with the fulcrum of the point bearing.

In a suitable construction of the magnetic suspension bearing for such electricity meters, the stator is a stationary ring-shaped magnet which cooperates with a rod-shaped magnet secured to the spindle, the length of the rod-magnet being more than double the height of the ring-magnet and the axial magnetisation of the two parts having the same direction.

In a modified form, the two parts of the axial, magnetic suspension means are annular and approximately the same height. The outer surfaces facing each other are conical and the cone is open at the top. The magnetisation of the two parts is radially and oppositely directed.

The construction comprising a sphere segment is advantageously housed in an evacuated vessel or a vessel filled with dilute gas. By said suspension of the rotor the friction of the bearing is minimized, hence the air-friction losses are relatively higher. By evacuating the vessel the air-friction losses are also greatly reduced. At a given angular velocity, any friction still occurring in a dilute gas is proportional to the speed due to the laminar currents and may consequently be regarded as a component of the external magnetic brake field. Moreover, the measuring member and the point bearing are protected against dust and dirt by the hermetically closed vessel. It has been found that by taking said steps the total friction counter torque is reduced to an extremely small fraction of that usually occurring in normal meters.

Said low friction losses permit the drive and the brake system to be reduced in size so that the total weight of the meter is extremely low.

Transmission of the rotor motion to the counting mechanism is preferably effected by making the rotor control, substantially without power, for example electronically, a source of energy, which is driven by the counting mechanism.

Figure 2:
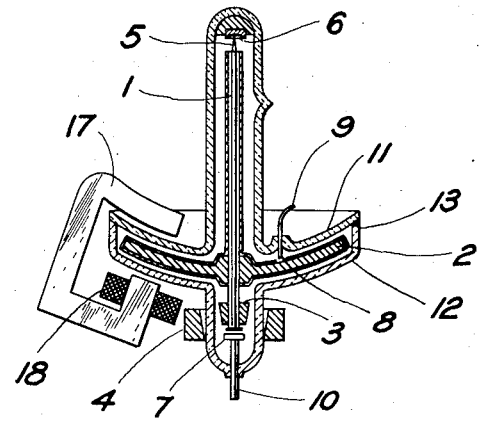
Figure 3:
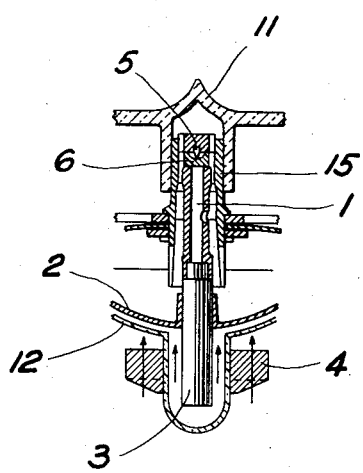
Figure 4:
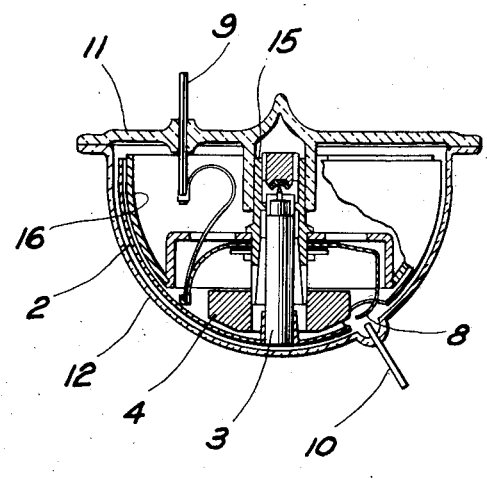

In order that the invention may be readily carried into effect it will now be described with reference to the accompanying drawing given by way of example, in which Fig. 1 shows a first form of a rotor and its associated bearing parts in accordance with the invention, and Figs. 2, 3 and 4 show modified forms.

In the device shown in Fig. 1, a vertical spindle 1 carries the active part of a measuring member 2, which part operates according to the Ferraris principle. A magnetic suspension bearing comprising a rotor 3 and a stator 4 is provided at the lower end. Both the rotor and the stator are annular, the rotor being provided within and concentrically with the stator. As indicated by arrows, they are permanently magnetized in a radial sense in such manner that poles of the same polarity face each other. The outer surface of the rotor 3 and the inner surface of the stator 4 are conical in order to strengthen the upwardly directed magnetic force components. The axial upwardly directed magnetic force is adjusted in such manner as to slightly exceed the total weight of the rotor. The spindle 1 is supported at its top and guided by the point bearing 5 in a stone cup 6 in order to prevent the upper end of the spindle moving in a radial and axial direction.

The two permanent magnets preferably consist of an oxidic permanent magnet material, such as described in British Patent 708,127. This material has a low specific weight and a low electrical conductivity.

A stop 7 radially and axially slightly spaced from the lower end of the spindle prevents the magnetic bearing from reaching an unstable area.

By said arrangement it is achieved that radial friction of the bearing is removed and, moveover, the friction in the point bearing 5, 6 is extremely low as a result of the axially reduced load.

By making provision that the magnetic bearing is magnetized in a radially symmetric manner, the rotor spindle also extends co-axially with respect to the stator ring and rotates without rocking.

As a result of the very low friction the driving and braking devices (not shown in Fig. 1) of the Ferraris disc may be made much smaller than is customary.

Fig. 2 shows a second form, in which the active measuring member of the rotor is not flat, as hitherto customary, but shaped as a sphere segment, the centre of the sphere coinciding with the fulcrum of the point bearing. Thus it is achieved that if the spindle deviates from the mid-position the spacing between the active measuring member on the one hand and the poleshoes of the drive and brake systems on the other hand does not vary. For the sake of clearness the thickness of the segment is shown slightly exaggerated. A driving magnet 17 with current- and voltage coils 18 surrounds the active rotor part in the usual manner. The brake magnet (not shown) is arranged in the usual manner.

In order further to rdeuce the friction of the spindle the rotor of the meter shown in Fig 2 is enclosed in at least a partly evacuated vessel which consists of two parts 11 and 12 sealed together at the edge 13. The vessel is preferably made from glass.

In view of the very low friction, steps known per se are preferably taken, which prevent slow rotation of the rotor at no-load of the meter circuit.

Such a step is, for example, the provision of a small piece of ferromagnetic material near the periphery of the active rotor body. Said piece is drawn by a small tangential force into the zone where the density of the lines of force of the brake field is a maximum, so that the rotor is maintained in this position until exceeding a starting current limit depending on the size of said piece. Sometimes, however, special steps can be dispensed with, since an existing asymmetry, for example in the magnetic suspension means, is sufficient to maintain the rotor at no-load in a given desired position.

If the rotor is enclosed in a vessel, the movement of the rotor is preferably transmitted electronically to the counting mechanism. This may be effected by melting into the vessel electrodes 9 and 10 between which a discharge occurs only in particular positions of the rotor. The impulses in the discharge circuit control the counting mechanism, for example by means of a step switch element.

Fig. 3 shows a modified form. In this case, the spindle of the rotor carries the stone cup 6, the steel point 5 being stationary. The rotor of the magnetic bearing is a rod-shaped magnet which is permanently magnetic in an axial direction. The stator 4 of the bearing is also permanently magnetized in an axial direction and this, as indicated by arrows, in the same sense as the rotor. In order to obtain an upwardly directed repelling force between both parts of the lower bearing, the centre of gravity of the rod-magnet is situated above the centre of gravity of the annular magnet. In the presence of a vessel 11, 12 the outer ring-magnet 4 may be provided outside the vessel on a cylindrical part thereof, said magnet being movable in an axial direction to adjust the pressure in the point bearing.

The segmental part 2 of the rotor is preferably secured direct to the rod-magnet 3. In order to adjust the magnetic radial symmetry the stator preferably consists of two parts which are slidable with respect to one another. The stone cup 6 of the bearing is provided at the top of the spindle. The point 5 is associated with a bushing 15.

Fig. 4 shows a form in which the point is directly provided on top of the rod-magnet. The cup is secured in the bushing 15 which moreover carries a ferromagnetic closure ring 16 for the magnetic fluxes of the drive and brake systems. The stator 4 of the magnetic bearing is slidable on the lower cylindrical portion of said closure ring. The assembly is, in turn, supported by a cylindrical part of the upper flat wall 11 of the vessel. In known bearings for rotors with a vertical spindle the rotor is situated between the bearing points. Characteristic of the arrangement shown in Fig. 4 is that the two bearing points are provided only on one side of the rotor.

Fig. 3 shows electrodes 9 and 10 between which a discharge occurs if the rotor is in a position in which the active part of the rotor releases the discharge path. To this end said part is provided with an opening 8 which once arrives in the range of the electrodes during each revolution.

It will be appreciated that members in accordance with the invention may alternatively be made for three-phase current and this for evenly loaded and unevenly loaded phases.

Reference is made to a copending application, Serial No. 492,577, filed March 7, 1955, in which application other features of the constructions described herein are claimed.

What is claimed is:

1. In an electricity meter, the combination of a rod-like, vertically-oriented, rotor member, magnetic means associated with a lower portion of said rotor member and providing magnetic forces which support said lower portion in space and free of contact with other members and which provide a horizontal, centering action on said lower portion, point and cup bearing means associated with the upper end of said rotor member for locating said upper end, a conductive member having the shape of a segment of a hollow sphere symmetrically surrounding and secured to the rotor member, the center of said spherical segment coinciding with the fulcrum of the point and cup bearing, and field-producing means to drive the rotor in close proximity to and surrounding a portion of said conductive member.

2. In an electricity meter, the combination of a rod-like, vertically-oriented, rotor member, a curved conductive member having the shape of a segment of a hollow sphere symmetrically surrounding and secured to the rotor member, magnetic means associated with a lower portion of said rotor and providing magnetic repelling forces which support said lower portion in space and free of contact with other members, said magnetic means comprising a pair of coaxial, permanent magnets with one at least partly within the other thereby to provide a horizontal centering action on said lower rotor portion, point and cup bearing means, one of which is fixed and the other of which is secured to the upper end of the rotor member for locating said upper end, said magnetic means providing a slight upward force causing said point and cup to remain in engagement with one another, said curved member being concentric with the fulcrum of the point and cup member, and field-producing means to drive the rotor in close proximity to and surrounding a portion of said conductive member.

3. A device as set forth in claim 2 wherein the pair of magnets includes a stationary, ring-shaped magnet of given height and a cylindrical rod-like magnet constituting at least part of the rotor and having a height at least twice as high as said given height and extending within and above said ring-shaped magnet, said magnets being magnetized both vertically and in the same direction.

4. A device as set forth in claim 3 wherein a portion of the point and cup bearing is secured directly to the upper end of the rod-like magnet.

5. A device as set forth in claim 3 wherein the curved member is secured directly to the rod-shaped magnet at a location above the ring-shaped magnet.

6. A device as set forth in claim 3 wherein the curved member is secured to the rotor member at a location below the pair of permanent magnets.

7. A device as set forth in claim 2 wherein the magnetic means comprises a pair of coaxial permanent magnets, said magnets both being annular and one being located within the other, said magnets both being magnetized in a horizontal direction but in opposite directions so that poles of like polarity are provided on the inner facing surfaces, said inner facing surfaces being conical such that upwardly-directed magnetic forces are exerted on the rotor member.

References Cited in the file of this patent

UNITED STATES PATENTS

| | | |
|---|---|---|
| 611,809 | Evershed | Oct. 4, 1898 |
| 1,472,198 | Taylor | Oct. 30, 1923 |
| 2,254,698 | Hansen | Sept. 2, 1941 |
| 2,315,408 | Faus | Mar. 30, 1943 |
| 2,436,939 | Schug | Mar. 2, 1948 |
| 2,747,944 | Baermann | May 29, 1956 |